United States Patent
Molloy et al.

(10) Patent No.: US 6,641,947 B1
(45) Date of Patent: Nov. 4, 2003

(54) AIR MANAGER SYSTEM FOR METAL AIR BATTERY

(75) Inventors: Kevin Molloy, Canton, MA (US); John A. Thompson, Peachtree City, GA (US); Bikram Yonjan, Watertown, MA (US); Robert Yoppolo, Woonsocket, RI (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/400,020

(22) Filed: Sep. 21, 1999

(51) Int. Cl.[7] .............................. H01M 2/14; H01M 8/02
(52) U.S. Cl. .............................. 429/39; 429/13; 429/32; 429/26
(58) Field of Search ................... 429/39, 38, 34, 429/82, 83, 71, 32, 26, 27, 13, 86, 12

(56) References Cited

U.S. PATENT DOCUMENTS

| | | | |
|---|---|---|---|
| 2,275,281 A | 3/1942 | Berl | |
| 2,914,595 A | 11/1959 | Darland, Jr., et al. | |
| 3,206,334 A | 9/1965 | Ehrenfeld | |
| 3,492,166 A | 1/1970 | Lindstrom | |
| 3,666,561 A | 5/1972 | Chiku | |
| 3,788,900 A | 1/1974 | Schmidt | |
| 3,843,413 A | 10/1974 | Schmidt | |
| 4,009,320 A | 2/1977 | Gerbier | |
| 4,038,461 A | 7/1977 | Warnock | |

(List continued on next page.)

FOREIGN PATENT DOCUMENTS

| | | |
|---|---|---|
| CA | 2163441 | 8/1999 |
| EP | 0311275 A2 | 4/1989 |
| EP | 0630527 B1 | 10/1996 |
| EP | 0696384 B1 | 11/1996 |
| EP | 0744784 A1 | 12/1996 |
| EP | 0940869 A2 | 9/1999 |
| EP | 0940870 A2 | 9/1999 |
| EP | 0940871 A2 | 9/1999 |
| EP | 0940872 A2 | 9/1999 |
| EP | 0940873 A2 | 9/1999 |
| EP | 0940874 A2 | 9/1999 |
| EP | 0940875 A2 | 9/1999 |
| EP | 0860032 B1 | 1/2000 |
| JP | 2970938 | 4/1994 |
| JP | 2753147 | 6/1994 |
| JP | 2108372 | 11/1996 |
| WO | WO 97/15090 | 4/1997 |
| WO | WO 97/44848 | 11/1997 |
| WO | WO 99/22414 | 5/1999 |

*Primary Examiner*—Stephen Kalafut
*Assistant Examiner*—Raymond Alejandro
(74) *Attorney, Agent, or Firm*—Fish & Richardson P.C.

(57) ABSTRACT

A method for controlling air flow in a metal air battery includes confining at least one metal air cell within a cartridge, which has an air inlet opening and an air outlet opening, and moving air through any of a plurality of air flow paths within the cartridge. Each of the paths passes through the air inlet opening of the cartridge, through a diffusion tube, through a distributor tube, across an active surface of at least one metal air cell, and through the air outlet opening of the cartridge, wherein all of the paths are substantially equal in length.

42 Claims, 5 Drawing Sheets

U.S. PATENT DOCUMENTS

| | | |
|---|---|---|
| 4,177,327 A | 12/1979 | Mathews et al. |
| 4,246,324 A | 1/1981 | de Nora et al. |
| 4,395,469 A | 7/1983 | Fritts |
| 4,448,858 A | 5/1984 | Graf et al. |
| 4,842,963 A | 6/1989 | Ross, Jr. |
| 4,859,545 A | 8/1989 | Scheffler et al. |
| 4,913,983 A | 4/1990 | Cheiky |
| 5,093,212 A | 3/1992 | Lloyd et al. |
| 5,183,222 A | 2/1993 | Ramsey, Jr. |
| 5,219,672 A | 6/1993 | Ramsey, Jr. |
| 5,356,729 A | 10/1994 | Pedicini |
| 5,366,822 A | 11/1994 | Korall et al. |
| 5,387,477 A | 2/1995 | Cheiky |
| 5,415,947 A | 5/1995 | Mitsui et al. |
| 5,424,143 A | 6/1995 | Shrim |
| 5,429,885 A | 7/1995 | Stockburger et al. |
| 5,445,901 A | 8/1995 | Korall et al. |
| 5,447,805 A | 9/1995 | Harats et al. |
| 5,487,955 A | 1/1996 | Korall et al. |
| 5,534,366 A | 7/1996 | Hwang et al. |
| 5,560,999 A | 10/1996 | Pedicini et al. |
| 5,571,630 A | 11/1996 | Cheiky |
| 5,573,869 A | 11/1996 | Hwang et al. |
| 5,602,454 A | 2/1997 | Arakawa et al. |
| 5,631,101 A | 5/1997 | Amero, Jr. |
| 5,691,074 A | 11/1997 | Pedicini |
| 5,721,064 A | 2/1998 | Pedicini et al. |
| 5,753,384 A | 5/1998 | Kimberg |
| 5,904,999 A | 5/1999 | Kimberg et al. |
| 5,919,582 A | 7/1999 | Pedicini et al. |
| 6,068,944 A * | 5/2000 | Witzigreuter ............... 429/27 |
| 6,087,029 A * | 7/2000 | Golovin et al. ............... 429/27 |

* cited by examiner

AIR MANAGER SYSTEM FOR METAL AIR BATTERY

BACKGROUND OF THE INVENTION

The invention generally relates to an air manager system for a metal air battery.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a sheet-like layer, typically called the separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal air electrochemical cell, oxygen is reduced at the cathode, and a metal is oxidized at the anode. Oxygen is supplied to the cathode from the atmospheric air external to the cell through one or several air access port(s) in the container.

During periods of inactivity, there is no need for air from the environment to diffuse into the cell. In fact, it is preferred that the supply of air to the cell be minimized, because the diffusion of air into the cell can lead to changes in the humidity level of the cell. When the humidity level of the outside atmosphere is lower than that of the cell, the cell can dry out. When the humidity level of the outside atmosphere is higher than that of the cell, the cell can flood. In addition, when air diffuses into the cell, the anode can become prematurely oxidized.

An air manager system enhances the activated storage life of a metal-air battery system by controlling the flow of air, which includes oxygen, carbon dioxide, and water, into and out of the system. During periods of battery use, an air mover, such as a fan, moves enough air into and out of the system to ensure good performance.

The distribution of air flow across the active surfaces of the cells can be uneven. Uneven air flow can result in "hot spots" in the battery, where the anode and the cathode react more than in other areas of the battery. Hot spots can lead to inconsistent battery performance and failure to realize the maximum capacity of the battery.

SUMMARY OF THE INVENTION

The air manager system of the invention provides for improved activated storage life of the battery contained in the system and provides for good performance of the battery during use. Air is directed across active surfaces of the battery evenly, thus optimizing performance. In addition, the system is designed for ease of use by the consumer.

In one aspect, the invention features an air manager system for a metal air cell. The system includes: (a) a housing having an air mover and an air outlet opening; and (b) a cartridge that is removable from the housing. The cartridge includes (i) a metal air cell; (ii) an air inlet opening located toward a first end of the cartridge and adjacent to a first side of the cartridge; (iii) an air outlet opening located toward a second end of the cartridge and adjacent to a second side of the cartridge; (iv) a first diffusion tube communicating with the air inlet opening of the cartridge, the first diffusion tube extending along the first side of the cartridge; (v) a second diffusion tube communicating with the air outlet opening of the cartridge, the second diffusion tube extending along the second side of the cartridge; (vi) a first distributor tube communicating with the first diffusion tube, the first distributor tube extending from the first diffusion tube along the first side of the cartridge through a change of direction and being adjacent to an air plenum, the first distributor tube including a plurality of openings communicating with the air plenum; and (vii) a second distributor tube communicating with the second diffusion tube, the second distributor tube extending from the second diffusion tube along the second side of the cartridge through a change of direction and being adjacent to the air plenum, the second distributor tube including a plurality of openings communicating with the air plenum.

The air mover can move air into the air inlet opening of the cartridge and/or extract air from the air outlet opening of the cartridge. The diffusion tube or tubes help to minimize the transport of water vapor into and out of the cartridge during periods of inactivity. The diffusion tubes therefore help to prevent the cells from flooding or drying out.

When the metal air cell has been depleted, the cartridge can be removed from the housing and replaced with a fresh cartridge. The housing, including the air mover, can be re-used with the new cartridge, instead of being replaced. This design helps to minimize the cost of using the air manager system. It also reduces the size of the cartridge, which in turn minimizes the amount of waste generated when the cartridge must be replaced.

In another aspect, the invention features an air manager system for a metal air cell. The system includes: (a) a housing having an air mover and an air outlet opening; and (b) a cartridge that is removable from the housing. The cartridge includes (i) a metal air cell; (ii) an air inlet opening; (iii) an air outlet opening; (iv) a first diffusion tube in communication with the air inlet opening and a second diffusion tube in communication with the air outlet opening; (v) a first distributor tube in communication with the first diffusion tube and a second distributor tube in communication with the second diffusion tube; and (vi) a first panel defining a plurality of openings communicating with the first distributor tube and a second panel defining a plurality of openings communicating with the second distributor tube. The diffusion tubes, the distributor tubes, and the openings cooperate to define a plurality of air flow paths that start at the air inlet opening of the cartridge, continue through the cartridge, and end at the air outlet opening of the cartridge. All of these air flow paths are substantially equal in length.

In another aspect, the invention features a method for controlling air flow in a metal air battery. The method includes: (a) confining at least one metal air cell within a cartridge having an air inlet opening and an air outlet opening; and (b) moving air through any of a plurality of air flow paths within the cartridge. Each of these air flow paths passes through the air inlet opening of the cartridge, through a diffusion tube, through a distributor tube, across an active surface of a cell, and through the air outlet opening of the cartridge. All of the air flow paths are substantially equal in length. The method can include moving air into the air inlet opening of the cartridge and/or extracting air from the air outlet opening of the cartridge.

Air from the atmosphere is forced into the cartridge by air discharged from an air mover, such as a blower, or pulled out of the cartridge as intake air supplied to an air mover, such as a vacuum device. It flows across the active surface of the cell contained in the cartridge, then exits the cartridge, rather than being recycled through the cartridge.

As used herein, "removable" means that a component can be easily removed, for example, by a consumer, without the need for tools or excessive force.

As used herein, "toward" means at a position on a member, relative to a given point on that member, within 30%, more preferably 20% or 10%, of the total length of the member. A feature located toward an end of a bar having a length of 10 cm is within 3 cm of that end of the bar, and is preferably 2 cm or 1 cm from the end.

Other features and advantages of the invention will be apparent from the description of the preferred embodiment thereof, and from the claims.

DESCRIPTION OF THE PREFERRED EMBODIMENTS

The air manager system of the invention can be used with devices such as cellular telephones. Air is directed across the active surfaces of the metal air cells uniformly, so relatively consistent battery performance can be achieved.

Figure 1:
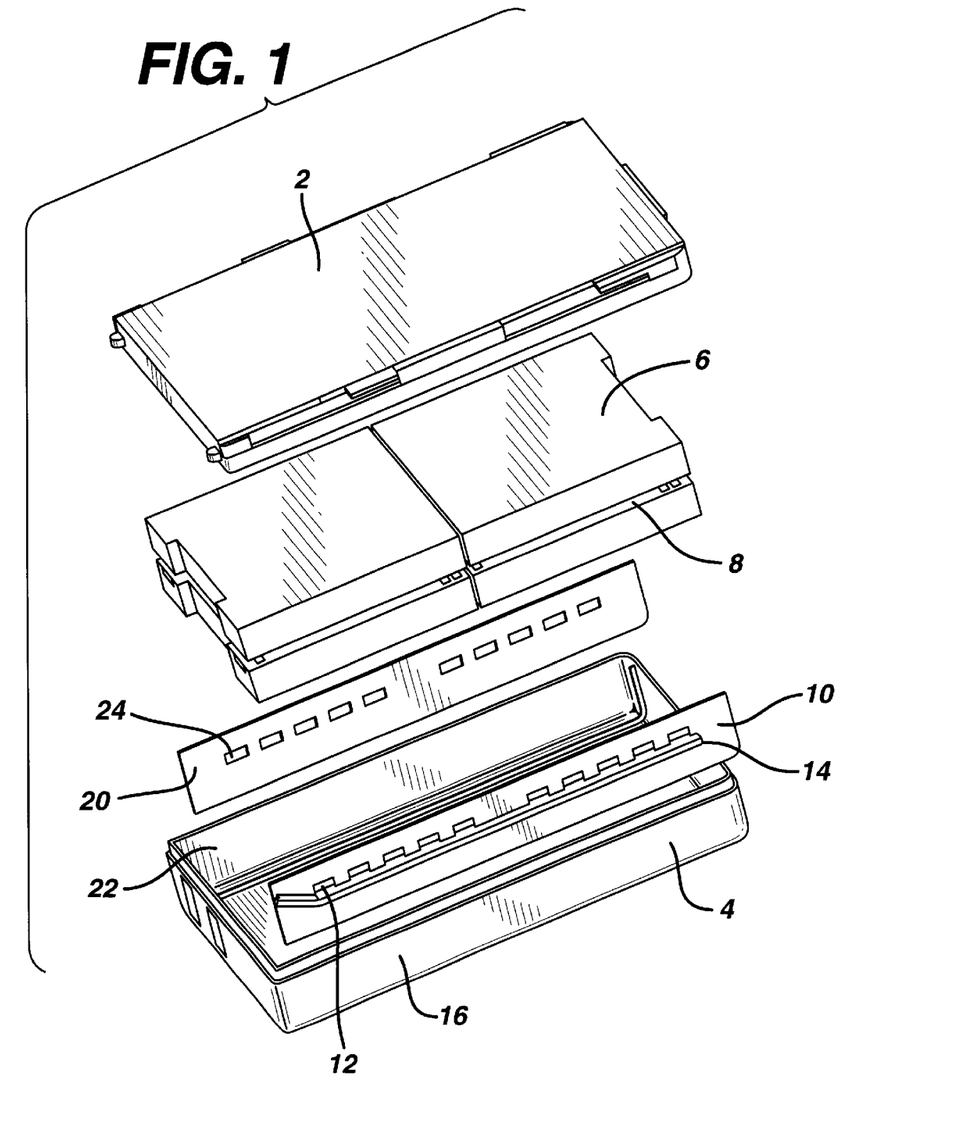
FIG. 1 is an exploded view of a cartridge of the invention.

Referring to FIG. 1, a cartridge includes a lower casing 2 and an upper casing 4. The cartridge may be made of any material that is impermeable to air, such as plastic or metal, or a combination thereof. Four metal air cells 6 are contained within the cartridge. Any type of metal-air cell, for example, prismatic cells, button cells, cylindrical cells, and bipolar construction cells can be used. The cells can be prepared, for example, as described in Linden, Handbook of Batteries, 2d ed. (1995). The cells are arranged in stacks of two. The cells within each stack are spaced apart vertically to define an air flow path 8 between the cells in the stack. The cathodes (the active surfaces) of these cells face each other within these stacks. The stacks are spaced apart horizontally.

An interior panel 10 of the cartridge has a plurality of openings 12. In addition, panel 10 has a ridge 14. When assembled, panel 10, ridge 14, and cartridge wall 16 define a long, thin path that serves as a diffusion tube and as a distributor tube for the cartridge. The openings 12 communicate with the distributor tube.

Interior panel 20 also includes a ridge (not shown). Interior panel 20, the ridge, and cartridge wall 22 define an air exit plenum that includes a second distributor tube and a second diffusion tube. Interior panel 20 has openings 24 that communicate with the distributor tube. In this embodiment, the diffusion tubes and the distributor tubes are integrated into the cartridge and therefore cannot be removed from the cartridge. This design is space efficient, and cartridges with this design are relatively inexpensive to produce.

Figure 2:
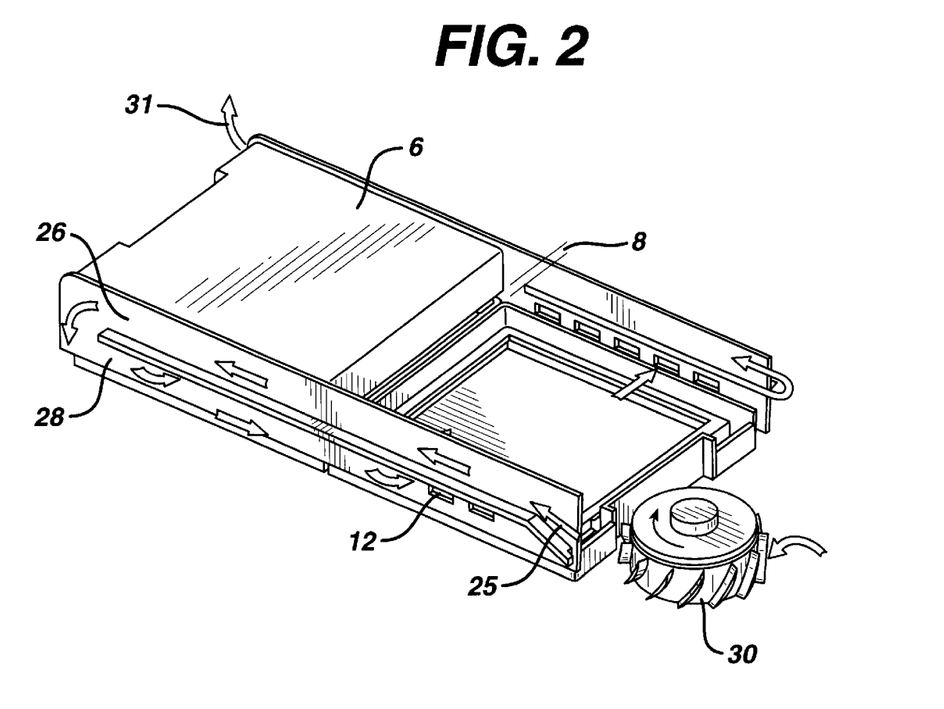
FIG. 2 is a cutaway view of a cartridge of the invention.

Referring to FIG. 2, air flows into the air inlet opening of the cartridge, as indicated by arrow 25. It flows along the length of the diffusion tube 26, then turns about 180°. It flows through distributor tube 28, turns about 90°, then flows through the openings 12. After the air flows across the cells, it is collected in a second distributor tube (not shown). It turns about 180°, flows through a second diffusion tube (not shown), then exits the cartridge through the air outlet opening, as indicated by arrow 31.

The diffusion tubes and distributor tubes are connected through approximately 180° turns. The turns make the air paths relatively convoluted, and therefore help to increase the isolation of the cells when the fan is off.

Figure 3:
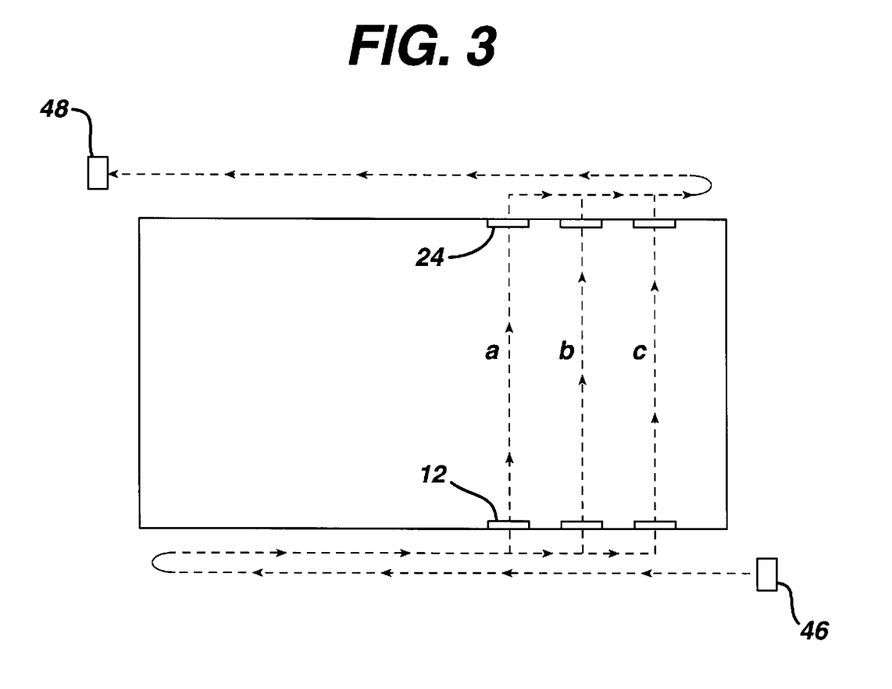
FIG. 3 is a top cross sectional view of a cartridge of the invention.

Referring to FIG. 3, the air flow paths through the cartridge are shown in more detail. Air enters the cartridge through air inlet opening 46. The air flows through a diffusion tube (not shown), through a distributor tube (not shown), and through openings 12. For clarity, not all of the openings are shown. The air flows across the cells, then through openings 24. The air then flows through a second distributor tube (not shown), through a second diffusion tube, then through air outlet opening 48.

As shown in FIG. 3, air can take any of air flow paths a, b, or c when flowing through the cartridge. The lengths of these paths, from the air inlet opening of the cartridge, through the cartridge, to the air outlet opening of the cartridge, are substantially the same. Therefore, all portions of the active surfaces are exposed to substantially the same amount of air flow, and problems such as "hot spots" and cell imbalance can be avoided.

The configuration and the size of the diffusion tubes help to keep air flow through the cartridge to a minimum when the blower 30 is off. Each of the diffusion tubes has a cross-sectional area of about 1 $mm^2$ to about 8 $mm^2$ and a length of about 10 mm to about 70 mm. The diffusion tubes are sized to permit a flow rate through the cartridge of about less than about $3.46 \times 10^{-2}$ L/hour, preferably less than about $3.46 \times 10^{-3}$ L/hour, when the air mover is off. Limited air flow helps to minimize the self-discharge of the battery and to reduce carbonization of the electrolyte. It also helps to maintain a constant humidity level in the cell, and helps to minimize the amount of oxygen and $CO_2$ entering the cell. Although limited air flow has many advantages, it is preferred that at least some oxygen remains in the cell. If the level of oxygen is too low, it can be difficult for the air mover to switch on after a period of inactivity.

The metal air cells 6 in the cartridge cooperate to define a battery that delivers a current of at least 300 mA when the air mover is on. In some embodiments, the battery delivers a current of at least 500 mA, 900 mA, 1000 mA, or 1700 mA when the air mover is on. In other embodiments, the battery has an output current density of about 1 to about 200 $mA/cm^2$, for example, about 10 to about 110 $mA/cm^2$, of air cathode surface when the air mover is on.

Figure 4:
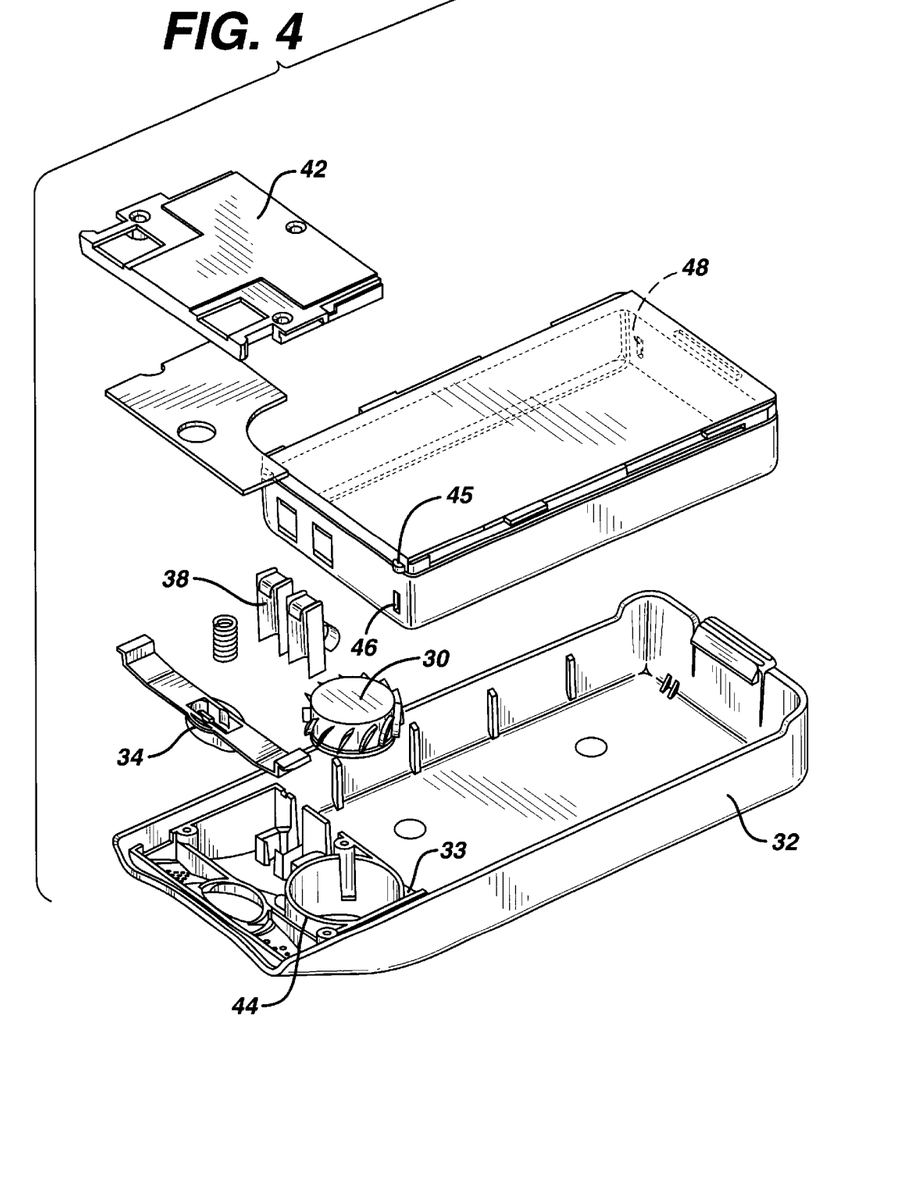
FIG. 4 is an exploded view of an air manager system of the invention.

Referring to FIG. 4, the housing includes a cover 32, a blower 30, an air outlet opening 33, a pack release button 34, a cartridge contact 38, and a base 42. The housing 44 for the blower is built into the pack housing, so there is no need for a separate case for the blower. The cartridge includes alignment tabs 45 that help the user position the cartridge in the proper orientation.

When the voltage drops below a certain level, the blower 30 turns on. When the blower is on, air is moved from the air outlet opening 33 of the housing to the air inlet opening 46 of the cartridge. Air moves through the cartridge as described above, then exits the cartridge through the air outlet opening 48.

Figure 5:
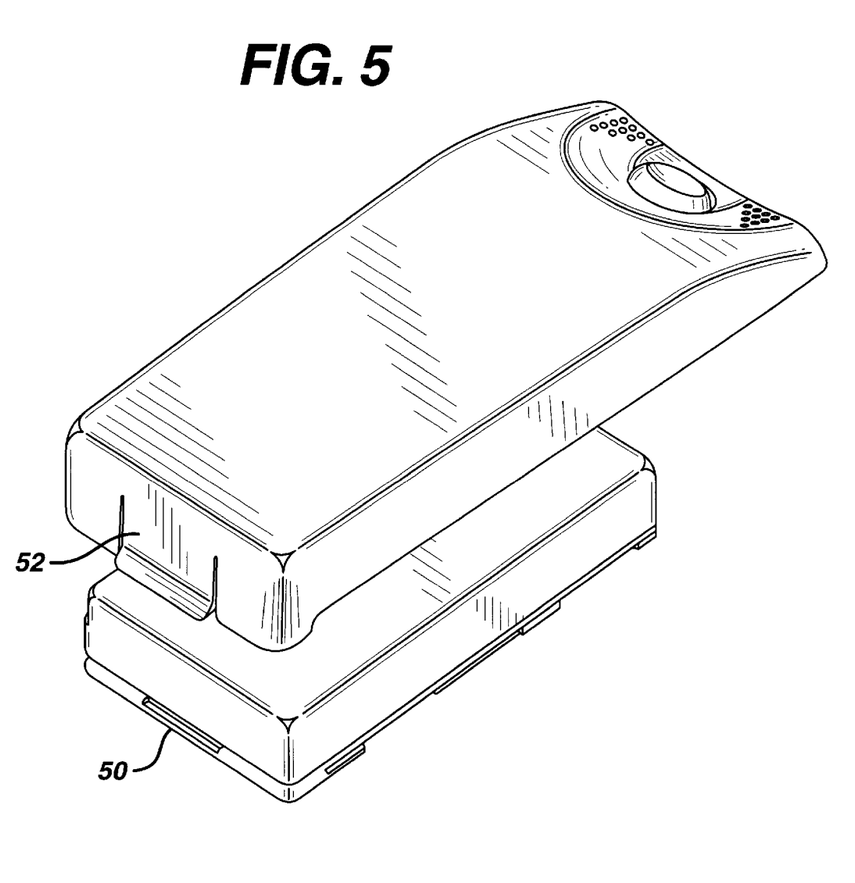
FIG. 5 is a pictorial view of an air manager system of the invention.

Referring to FIG. 5, the locking tab 50 of the cartridge and the cartridge release latch 52 of the housing interlock to hold the cartridge in the housing. The cartridge release latch also serves the purpose of allowing air to exit the housing.

When the cells in the cartridge are depleted, the entire cartridge can be easily removed, then replaced with a fresh cartridge. The cartridge and the housing are configured to interlock only when the cartridge is placed in the housing in the proper position. That is, the cartridge and housing interlock only when the air inlet opening in the cartridge and the air outlet opening of the housing align. In addition, the electrical contacts align in this position. This configuration prevents a consumer from placing the cartridge in the housing upside-down, or rotated by 180°.

All publications and patents mentioned in this application are herein incorporated by reference to the same extent as if each individual publication or patent was specifically and individually indicated to be incorporated by reference.

Other embodiments are within the scope of the following claims.

What is claimed is:

1. A method for controlling air flow in a metal air battery comprising:
   (a) confining at least one metal air cell within a cartridge, said cartridge having an air inlet opening and an air outlet opening; and
   (b) moving air through any of a plurality of air flow paths within said cartridge,
      wherein each of said paths passes through the same air inlet opening of said cartridge, through a diffusion tube, through a distributor tube, across an active surface of at least one of metal air cell, and through the same air outlet opening of said cartridge, and wherein all of said paths are substantially equal in length.

2. The method of claim 1, wherein each of said air flow paths passes through two diffusion tubes and two distributor tubes.

3. The method of claim 1, wherein each of said air flow paths passes through an opening in a panel.

4. The method of claim 1, wherein air is moved through said cartridge by an air mover exterior to said cartridge.

5. The method of claim 4, wherein said air mover pushes air into said cartridge.

6. The method of claim 5, wherein said air mover extracts air from said cartridge.

7. The method of claim 1, wherein step (b) includes moving air through the diffusion tube, changing the direction of air flow 180°, then moving air through the distributor tube.

8. The method of claim 1, wherein step (b) includes moving air through the diffusion tube, changing the direction of air flow 180°, moving air through the distributor tube, changing the direction of air flow 90°, then moving air across an active surface of at least one metal-air cell.

9. A method for controlling air flow in a metal air battery, the method comprising:
   (a) confining at least one metal air cell within a cartridge, the cartridge having an air inlet opening and an air outlet opening; and
   (b) moving air through any of a plurality of air flow paths within the cartridge,
      wherein each of the paths passes through the air inlet opening of the cartridge, then through a diffusion tube, then through a distributor tube, then across an active surface of at least one metal air cell, the active surface being distinct from the distributor tube, and then through the air outlet opening of the cartridge, and wherein all of the paths are substantially equal in length.

10. The method of claim 9, wherein, after passing across the active surface of at least one metal air cell, each of the paths passes through a second distributor tube, and then through a second diffusion tube.

11. The method of claim 9, wherein each of said air flow paths passes through an opening in a panel.

12. The method of claim 9, wherein air is moved through said cartridge by an air mover exterior to said cartridge.

13. The method of claim 12, wherein said air mover pushes air into said cartridge.

14. The method of claim 13, wherein said air mover extracts air from said cartridge.

15. The method of claim 9, wherein step (b) includes moving air through the diffusion tube, changing the direction of air flow 180°, then moving air through the distributor tube.

16. The method of claim 9, wherein step (b) includes moving air through the diffusion tube, changing the direction of air flow 180°, moving air through the distributor tube, changing the direction of air flow 90°, then moving air across an active surface of at least one metal-air cell.

17. A method for controlling air flow in a metal air battery, the method comprising:
   (a) confining at least one metal air cell within a cartridge, the cartridge having an air inlet opening and an air outlet opening; and
   (b) moving air through any of a plurality of air flow paths within the cartridge,
      wherein each of said paths passes through said air inlet opening of said cartridge, through a diffusion tube, through a distributor tube, and across an active surface of at least one of metal air cell, and
      wherein all of said paths pass through one air outlet opening of said cartridge and are substantially equal in length.

18. The method of claim 17, wherein each of said air flow paths passes through two diffusion tubes and two distributor tubes.

19. The method of claim 17, wherein each of said air flow paths passes through an opening in a panel.

20. The method of claim 17, wherein air is moved through said cartridge by an air mover exterior to said cartridge.

21. The method of claim 20, wherein said air mover pushes air into said cartridge.

22. The method of claim 21, wherein said air mover extracts air from said cartridge.

23. The method of claim 17, wherein step (b) includes moving air through the diffusion tube, changing the direction of air flow 180°, then moving air through the distributor tube.

24. The method of claim 17, wherein step (b) includes moving air through the diffusion tube, changing the direction of air flow 180°, moving air through the distributor tube, changing the direction of air flow 90°, then moving air across an active surface of at least one metal-air cell.

25. A method for controlling air flow in a metal air battery, the method comprising:
   (a) confining at least one metal air cell within a cartridge, said cartridge having an air inlet opening and an air outlet opening; and
   (b) moving air through any of a plurality of air flow paths within said cartridge,
      wherein each of said paths passes through said air inlet opening of said cartridge, through a first diffusion tube, through a first distributor tube, across an active surface of at least one of metal air cell, through a second distributor tube, through a second diffusion tube, and through said air outlet opening of said cartridge, and wherein all of said paths are substantially equal in length.

26. The method of claim 25, wherein each of said air flow paths passes through an opening in a panel.

27. The method of claim 25, wherein air is moved through said cartridge by an air mover exterior to said cartridge.

28. The method of claim 27, wherein said air mover pushes air into said cartridge.

29. The method of claim 28, wherein said air mover extracts air from said cartridge.

30. The method of claim 25, wherein step (b) includes moving air through the first diffusion tube, changing the direction of air flow 180°, then moving air through the first distributor tube.

31. The method of claim 25, wherein step (b) includes moving air through the first diffusion tube, changing the direction of air flow 180°, moving air through the first distributor tube, changing the direction of air flow 90°, then moving air across an active surface of at least one metal-air cell.

32. A method for controlling air flow in a metal air battery, the method comprising:
   (a) confining at least one metal air cell within a cartridge, said cartridge having an air inlet opening and an air outlet opening; and
   (b) moving air through any of a plurality of air flow paths within said cartridge,
      wherein each of said paths passes through the same air inlet opening of said cartridge, across an active surface of at least one of metal air cell, and through the same air outlet opening of said cartridge, and wherein all of said paths are substantially equal in length.

33. The method of claim 32, wherein each of said air flow paths passes through two diffusion tubes and two distributor tubes.

34. The method of claim 32, wherein each of said air flow paths passes through an opening in a panel.

35. The method of claim 32, wherein air is moved through said cartridge by an air mover exterior to said cartridge.

36. The method of claim 35, wherein said air mover pushes air into said cartridge.

37. The method of claim 36, wherein said air mover extracts air from said cartridge.

38. The method of claim 32, wherein step (b) includes moving air through a diffusion tube, changing the direction of air flow 180°, then moving air through a distributor tube.

39. The method of claim 32, wherein step (b) includes moving air through the diffusion tube, changing the direction of air flow 180°, moving air through the distributor tube, changing the direction of air flow 90°, then moving air across an active surface of at least one metal-air cell.

40. The method of claim 25, wherein step (b) includes moving air through the second distributor tube, changing the direction of air flow 180°, then moving air through the second diffusion tube.

41. The method of claim 25, wherein step (b) includes moving air across the active surface of the at least one of metal air cell, changing the direction of air flow 90°, moving air through the second distributor tube, changing the direction of air flow 180°, then moving air through the second diffusion tube.

42. The method of claim 32, wherein step (b) includes moving air through a distributor tube, changing the direction on air flow 180°, then moving air through a diffusion tube.

* * * * *

UNITED STATES PATENT AND TRADEMARK OFFICE
CERTIFICATE OF CORRECTION

PATENT NO.     : 6,641,947 B1
DATED          : November 4, 2003
INVENTOR(S)    : Robert Yoppolo et al.

It is certified that error appears in the above-identified patent and that said Letters Patent is hereby corrected as shown below:

<u>Title page,</u>
Item [56], References Cited, FOREIGN PATENT DOCUMENTS, after 0696384B1, replace "11/1996" with -- 12/1996 --, after "0744784A1" replace "12/1996" with -- 11/1996 --.

Signed and Sealed this

Fifth Day of October, 2004

JON W. DUDAS
*Director of the United States Patent and Trademark Office*